(No Model.)
A. GUMP.
TRANSPORTING FRAME AND WHEEL FOR HARVESTERS.
No. 276,581. Patented May 1, 1883.
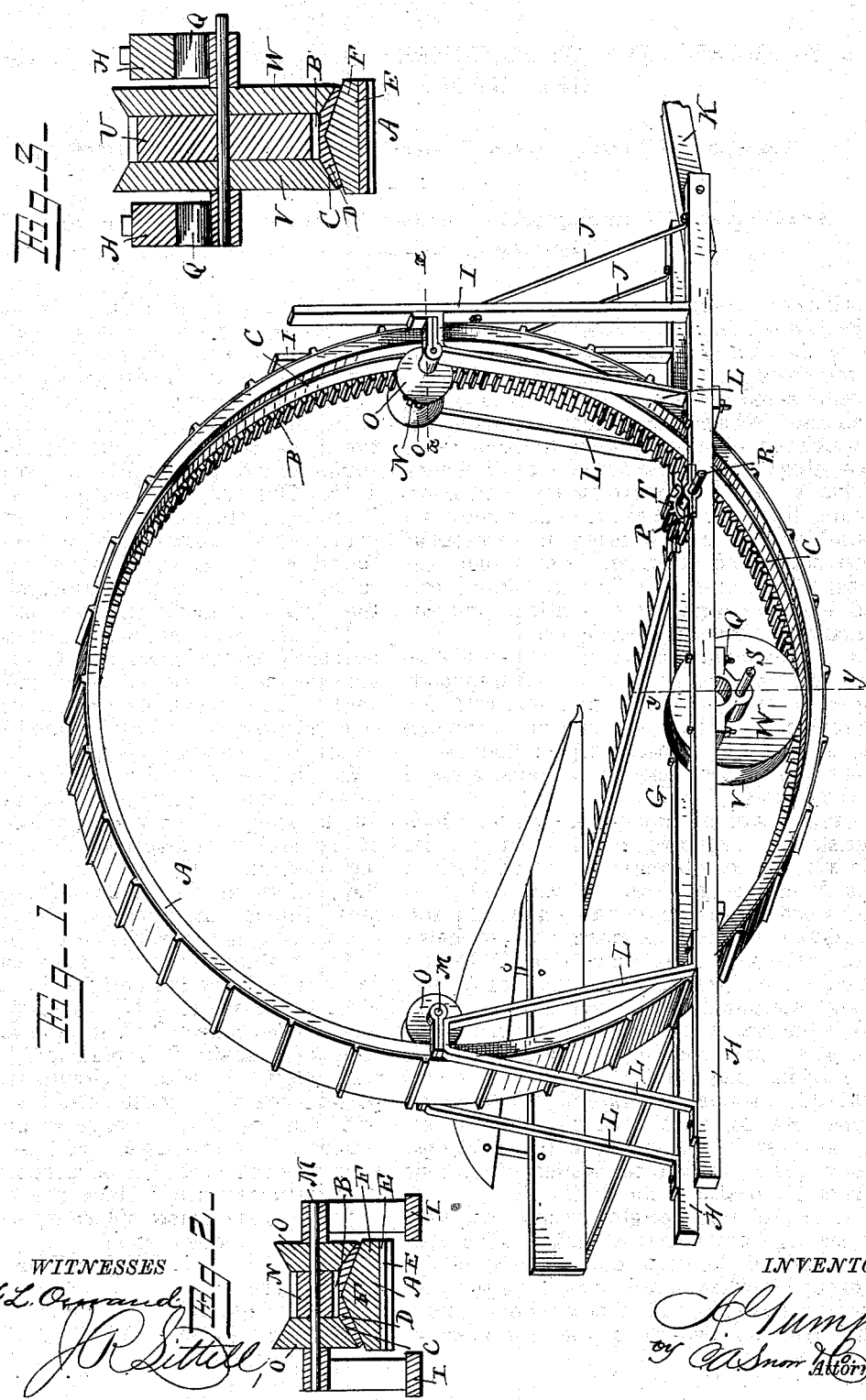

UNITED STATES PATENT OFFICE.

ALEXANDER GUMP, OF FLETCHER, OHIO, ASSIGNOR OF ONE-HALF TO JOHN KINDLE, OF SAME PLACE.

TRANSPORTING FRAME AND WHEEL FOR HARVESTERS.

SPECIFICATION forming part of Letters Patent No. 276,581, dated May 1, 1883.

Application filed November 14, 1882. (No model.)

*To all whom it may concern:*

Be it known that I, ALEXANDER GUMP, a citizen of the United States, residing at Fletcher, in the county of Miami and State of Ohio, have invented a new and useful Transporting Frame and Wheel for Harvesters and Binders, of which the following is a specification, reference being had to the accompanying drawings.

This invention relates to an improved transporting frame and wheel for harvesters and grain-binders; and it consists in the peculiar construction and arrangement of a spokeless transporting-wheel and the main frame carried thereby, as hereinafter described, and particularly pointed out in the claim.

In the drawings, Figure 1 is a perspective view, showing the main frame and transporting-wheel of a harvester equipped with my improvement. Fig. 2 is a section on the line *x x*, and Fig. 3 is a section on the line *y y*.

The same letters refer to the same parts in all the figures.

A represents the transporting-wheel, which consists of a large ring, provided on its inner side with a circumferential series of teeth or cogs, B, adjoining which beveled tracks C C are formed. Said wheel may consist of a single casting; or it may be constructed, as shown in the drawings, of an inner ring, D, having the cogs B and tracks C, an outer ring or tire, E, and interposed wooden fellies, F.

G is the frame of the machine, which consists of a pair of longitudinal parallel sills, H H, provided near their front ends with uprights I I, sustained by braces J, and intended to form bearings for the reel-shaft, which latter, however, is not shown in the drawings. The tongue K is pivoted between the front ends of the beams or sills H H.

L L are suitable uprights or brackets, having bearings for transverse shafts M M, located at the ends of the horizontal diameter of the transporting-wheel, and having pinions N, engaging the teeth B, and beveled rollers O, traveling upon the tracks C of the transporting-wheels. The shafts M may be lengthened, and mechanism may be provided for conveying motion from said shafts to the machinery of the harvester and binding mechanism.

The sills H H are also provided with boxes or bearings P and brackets or hangers Q for the shafts R S, which, like the shafts M, are equipped with pinions T U and beveled rollers V W. The pinion and rollers U W upon shaft S are larger than the rest, and serve to support the main frame upon the lowest point of the wheel A. Power may be taken in any suitable manner from the several shafts for the purpose of driving parts of the machinery.

The cutting and binding mechanism has been purposely omitted from the drawings hereto annexed, as it forms no part of my present invention, and as any one acquainted with this class of machines will understand how it may be constructed and arranged.

It will be evident from the construction and arrangement of the wheel A that all necessity for elevating the cut grain from the platform of the machine is dispensed with, as the binding mechanism may be placed on the level of the platform and the sheaves be dumped directly through the wheel A.

I claim as my invention—

The combination of the frame consisting of the sills H H, having uprights I I and brackets L L, the shafts M M, having pinions N N and beveled rollers O O, and the boxes P and hangers Q, shafts R S, pinions T U and beveled rollers V W, with the circular ring or transporting-wheel A, constructed, as described, with interior teeth or cogs B, and beveled tracks C C, all arranged and operating substantially as and for the purpose set forth.

In testimony that I claim the foregoing as my own I have hereto affixed my signature in presence of two witnesses.

ALEXANDER GUMP.

Witnesses:
M. DUNCAN,
ISAAC KISER.